United States Patent
Braker et al.

(10) Patent No.: US 7,146,873 B2
(45) Date of Patent: Dec. 12, 2006

(54) CABLE PULL ADJUSTMENT FOR A PARKING BRAKE

(75) Inventors: Ulf Braker, Berlin (DE); Josef Neudorfer, Hengersberg (DE)

(73) Assignee: Edscha Betaetigungssysteme GmbH, Hengersberg (DE)

(*) Notice: Subject to any disclaimer, the term of this patent is extended or adjusted under 35 U.S.C. 154(b) by 92 days.

(21) Appl. No.: 10/469,505

(22) PCT Filed: Mar. 1, 2002

(86) PCT No.: PCT/DE02/00765

§ 371 (c)(1),
(2), (4) Date: Feb. 19, 2004

(87) PCT Pub. No.: WO02/070311

PCT Pub. Date: Sep. 12, 2002

(65) Prior Publication Data

US 2004/0129512 A1 Jul. 8, 2004

(30) Foreign Application Priority Data

Mar. 2, 2001 (DE) .................. 101 10 079

(51) Int. Cl.
*G05G 5/06* (2006.01)
*F16C 1/10* (2006.01)
*F16D 65/14* (2006.01)

(52) U.S. Cl. ............ 74/501.6; 74/500.5; 74/535; 74/536; 74/540; 74/541; 188/2 D; 188/196 B

(58) Field of Classification Search .......... 74/537, 74/538, 523, 524, 500.5, 501.6 R, 560, 540, 74/541, 535, 536; 188/2 D, 196 B
See application file for complete search history.

(56) References Cited

U.S. PATENT DOCUMENTS

| 1,288,362 | A | * | 12/1918 | Yeider | 74/140 |
| 2,625,053 | A | * | 1/1953 | Cartwright | 74/503 |
| 4,448,090 | A | | 5/1984 | Carre et al. | 74/501.5 |
| 4,793,206 | A | | 12/1988 | Suzuki | 74/501.5 |
| 4,854,187 | A | * | 8/1989 | Walters | 74/535 |

(Continued)

FOREIGN PATENT DOCUMENTS

DE 36 34 112 9/1987

(Continued)

OTHER PUBLICATIONS

PTO 06-4275, English Translation of German Utility Model No. DE 297 21 843 U1.*

*Primary Examiner*—Vinh T. Luong
(74) *Attorney, Agent, or Firm*—Davidson, Davidson & Kappel, LLC

(57) ABSTRACT

A device for adjusting a cable pull of a vehicle parking brake includes an actuating lever rotatable about a first axis, a pull element and a locking element. The pull element includes a pull rod and a guide housing, wherein the pull rod includes notches and is spring-loaded in an actuating direction of the cable pull. The guide housing is pivotably mounted about a second axis disposed outside a line defined by the actuating direction. The locking element includes a latch part releasably engaging the notches of the pull rod, wherein the locking element is mounted pivotably with respect to the guide housing, wherein a force acting in the actuating direction of the cable pull creates a torque on the pull element about the second axis that is proportional to the force.

14 Claims, 3 Drawing Sheets

U.S. PATENT DOCUMENTS

| | | | |
|---|---|---|---|
| 4,958,536 A * | 9/1990 | Baumgarten | 74/501.5 R |
| 5,609,066 A * | 3/1997 | Bunker et al. | 74/537 |
| 5,699,884 A | 12/1997 | Koch et al. | 188/196 |
| 5,875,688 A * | 3/1999 | Porter et al. | 74/512 |
| 5,950,496 A | 9/1999 | Rampp | 74/538 |
| 6,868,751 B1 * | 3/2005 | Sundqvist et al. | 74/500.5 |

FOREIGN PATENT DOCUMENTS

| | | |
|---|---|---|
| DE | 29721843 | 1/1999 |
| EP | 0 754 135 | 10/1997 |
| EP | 0895909 | 2/1999 |
| WO | 9857832 | 12/1998 |

* cited by examiner

CABLE PULL ADJUSTMENT FOR A PARKING BRAKE

The present invention relates to a device for adjusting a cable pull for parking brakes.

Modern automobile construction makes increasing use of parking brakes which are actuated by a cable pull, including manually actuated and foot-actuated parking brakes, in which maintenance-free operation is ensured as far as possible over the entire service life of the motor vehicle by means of an automatic cable pull adjustment.

WO 98 578 32 describes a cable pull adjustment for parking brakes, in which a clamping element and a pull rod are guided movably in a clamping housing, a ratchet mechanism which is situated between the pull rod and the clamping element being brought into engagement on the clamping housing via a wedge guide. In an arrangement of this type, the clamping element and the pull rod are guided in a sliding manner, with friction occurring over a large surface area on both parts. A contact pressure, which is used for securing purposes, in the ratchet mechanism is brought about by the clamping element sliding over a wedge guide, with friction likewise occurring. Soiling which inevitably occurs during a service life of many years due to particles penetrating from the outside or else due to abrasion may cause the device to jam.

DE 297 21 843 U1 describes a cable pull adjustment for parking brakes, in which a pull rod which is provided with notches is fixed on a guide housing by means of a slot-shaped recess, with a locking element which interacts with the notches being formed on the guide housing. A guide pin reaches through the slot-shaped recess and secures the pull rod on the guide housing in such a manner that the pull rod is held in a manner such that it can be displaced longitudinally and also tilted about the guide pin with respect to the guide housing, a spring supporting the pull rod against the guide housing. A pull cable for actuating a brake is fixed to the pull rod.

It is the object of the invention to specify a device for adjusting a cable pull for parking brakes, which can be produced cost-effectively, ensures long and reliable operation and is not susceptible to soiling.

The present invention provides a device for adjusting a cable pull of a vehicle parking brake, that includes an actuating lever rotatable about a first axis, a pull element and a locking element. The pull element includes a pull rod and a guide housing, wherein the pull rod includes notches and is spring-loaded in an actuating direction of the cable pull. The guide housing is pivotably mounted about a second axis disposed outside a line defined by the actuating direction of the cable pull. The locking element includes a latch part releasably engaging the notches of the pull rod, wherein the locking element is mounted pivotably with respect to the guide housing and wherein a force acting in the actuating direction of the cable pull creates a torque on the pull element about the second axis that is proportional to the force.

A device according to the invention advantageously has a pull element which is mounted pivotably and is moved toward a locking element by means of pivoting caused by the cable pull being tensioned. The engagement of latches provided on the locking element in notches provided on the pull element is therefore reinforced with increasing tensioning of the cable pull, as a result of which high operational reliability is ensured.

The pull element advantageously comprises a pull rod which is held in a guide housing and on which the notches of the pull element are formed. The design enables the pull rod to have a sufficient amount of play in the guide housing and to have a relatively small surface area guided with friction, with the result that jamming due to soiling or abrasion can be virtually eliminated.

In order to ensure engagement of the locking element with the pull element even if the cable pull is not tensioned, a pre-loading spring is advantageously provided which is supported on one side against the guide housing and on the other side against the locking element.

In a preferred embodiment of the device according to the invention, the locking element is mounted in a manner such that it can pivot about the same axis as the pull element, as a result of which possible jamming of the device is eliminated to a particular extent.

The cable pull adjustment is advantageously brought about via an adjusting spring which supports the pull rod against the guide housing in a longitudinal direction of the pull rod, which contributes to a particularly compact construction of the device according to the invention.

A stop is particularly advantageously provided and is used to prevent engagement of the locking element with the pull element in a normal position of the actuating lever, with the result that malfunctions of the cable pull adjustment, for example due to the cable pull becoming stuck e.g. by freezing in winter, are avoided.

In order to permit simple and rapid installation of the parking brake, a ball cage is advantageously articulated in a pivotable manner at one end of the pull element, it being possible for that end of a pull cable which is provided with a ball-like thickened section to be inserted with simple movement into said ball cage, with it being fixed in the ball cage by the pull cable being pulled back.

BRIEF DESCRIPTION OF THE DRAWINGS

Further advantages and features of the invention emerge from the exemplary embodiment described below and from the dependent claims.

The invention will be explained in greater detail below with reference to a preferred exemplary embodiment of the invention using the attached drawings.

DETAILED DESCRIPTION

Figure 1:
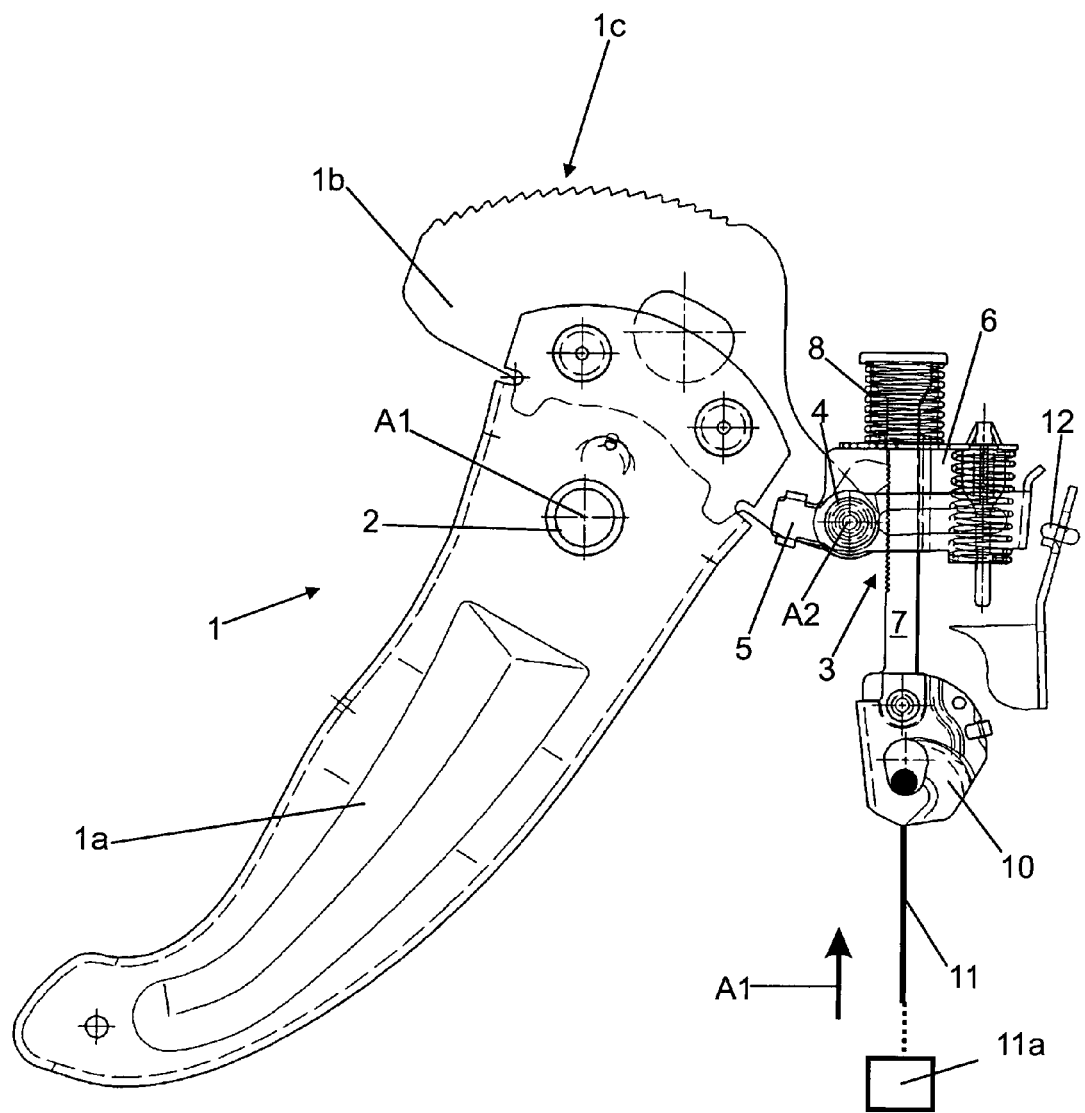
FIG. 1 shows a side view of a device according to the invention with the lever in the actuated position.

As can be seen from FIG. 1, the parking brake illustrated in the present exemplary embodiment is a foot-operated parking brake which comprises an actuating lever 1 which can be rotated about a first axis A1 by means of a lever bearing 1d. The actuating lever 1 is designed in two parts, a pedal part 1a and a ratchet part 1b being fixed to each other. A locking element 5 and a pull element 3 are fixed on the actuating lever 1 in a manner such that they can pivot about a second axis A2 in a rotary joint 4.

Figure 2:
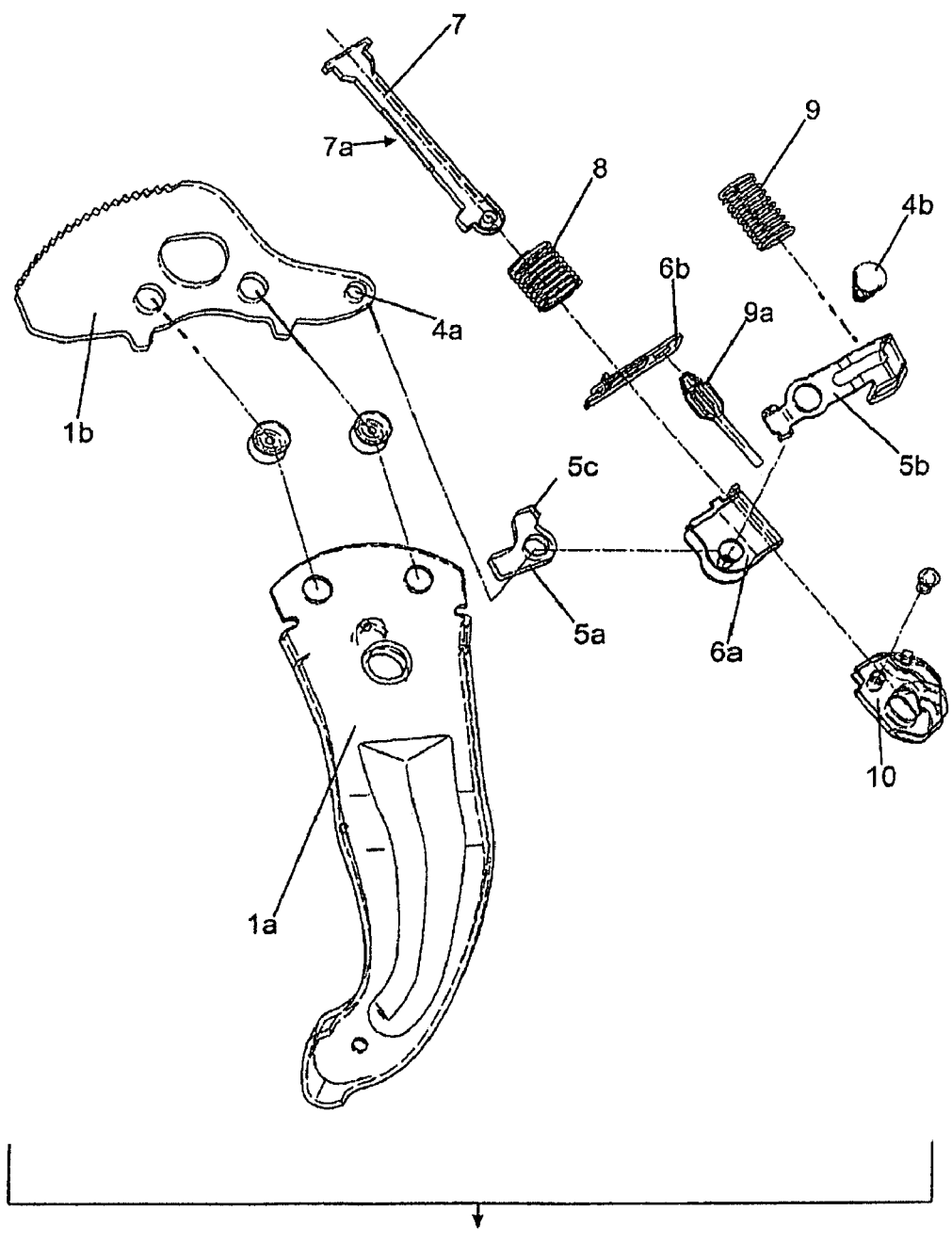
FIG. 2 shows an exploded drawing according to FIG. 1.

As is apparent in particular from FIG. 2, the rotary joint 4 comprises a hole 4a on the ratchet part 1b of the actuating lever 1 and a graduated rivet 4b. The locking element 5 comprises a latch part 5a and a lever part 5b. This is advantageous since the latch part 5a is expediently manufactured from a hard material, whereas the lever part 5b is a shaped part of complicated shaping made from simple sheet metal. The pull element 3 comprises a guide housing 6, which is composed of two sheet-metal shaped parts 6a and 6b, and a pull rod 7 on which notches 7a are formed. The pull rod 7 is enveloped by an adjusting spring 8 which supports the pull rod 7 in its longitudinal direction against the guide housing 6. The locking element 5 is supported against the pull element 3 by a torque produced by means of a pre-loading spring 9, the pre-loading spring 9 being held by a pin 9a which is fixed on the guide housing 6 of the pull element 3. A ball cage 10 is fixed pivotably to one end of the pull rod 7 of the pull element 3 and into it is placed the end of a cable 11 (see FIG. 1) which belongs to the cable pull 11a of the parking brake.

Furthermore, a stop 12 which is fixed on the bodywork is provided (see FIG. 1).

Figure 3:
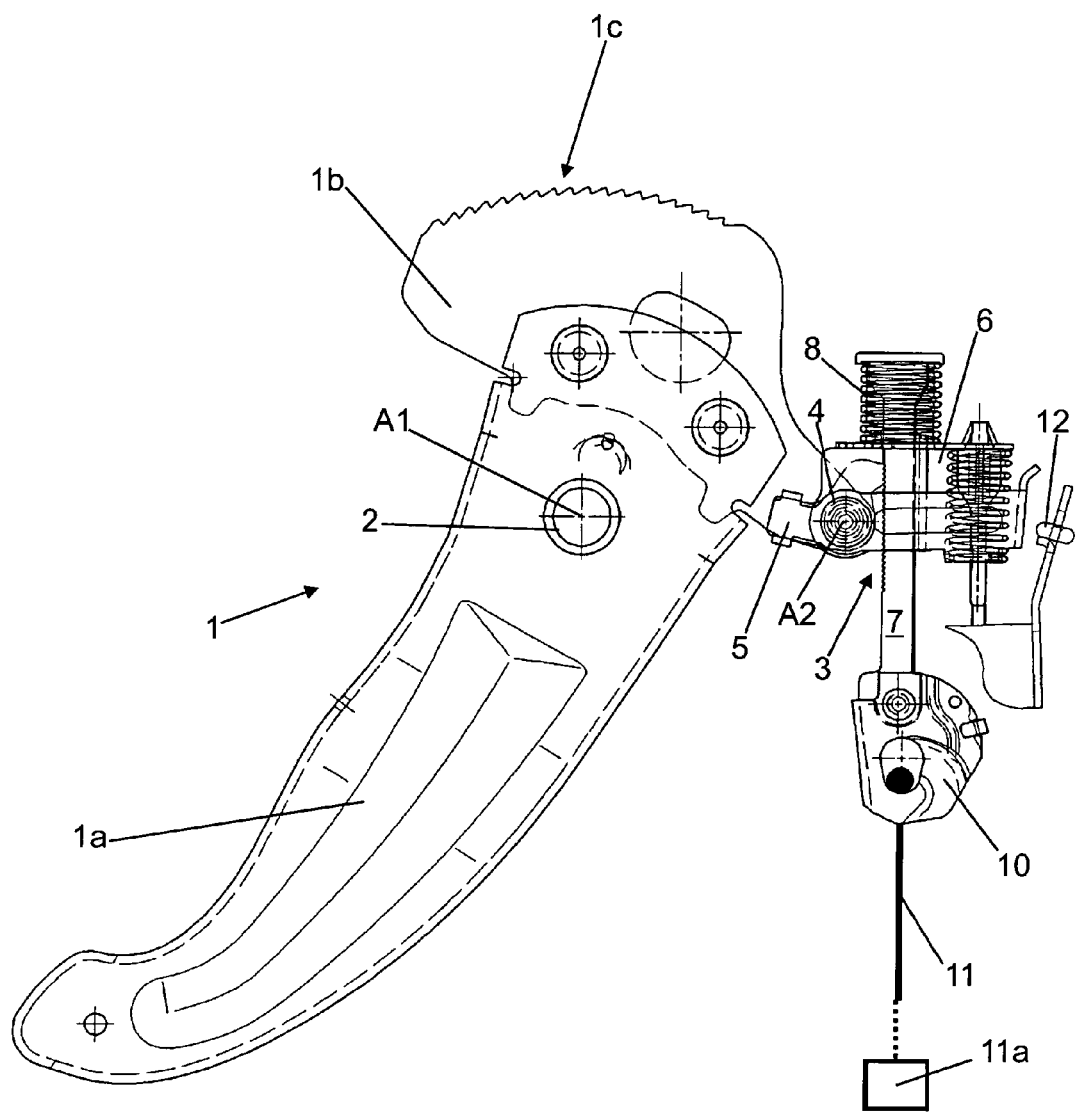
FIG. 3 shows a side view of the device shown in FIG. 1, wherein the lever is in the released position.

The invention operates as follows:

In a normal position of the actuating lever 1, the stop 12 which is fixed on the bodywork engages on the locking element 5, with the result that the latch part 5a and the notches 7a of the pull rod 7 are not engaged, as shown in FIG. 3. If the actuating lever 1 is actuated, it is rotated anticlockwise about the first axis A1, as shown in FIG. 1. Even after a few degrees of rotation the stop 12 no longer engages on the locking element 5, with the result that the locking element 5 and the pull element 3 are brought into engagement with each other by means of the prestressing spring 9. In this state, the pull rod 7, which is correspondingly pushed forward by the adjusting spring 8, causes the cable 11 to be in a pretensioned position in which there is no play in the cable 11. As actuation of the parking brake continues, the tension of the cable 11 increases, with the position of the pull rod 7 in the guide housing 6 of the pull element 3 being fixed by the engagement of the locking element 5 in the notches 7a. Owing to the fact that the pulling direction (corresponding to the actuating direction shown by arrow A3) of the cable 11 and the central point of the rotary joint 4 are not inline, torque is produced in the rotary joint 4 that is proportional in its magnitude to the tensile force of the cable 11 and therefore presses notches 5c of the latch part 5a of the locking element 5 against the notches 7a of the pull rod 7 as the force increases. This ensures that, even with large tensile forces of the cable 11, the pull rod 7 of the pull element 3 remains arrested in its position.

The arresting of the parking brake in its actuated position takes place in a known manner via a ratchet toothing 1c, which is formed here on the ratchet part 1b of the actuating lever 1. This shows the advantage of a two-part construction of the actuating lever 1, since a ratchet toothing 1c of this type preferably consists of a harder material than is necessary for the lever part 1a of the actuating lever 1.

In an unfavorable case, for example due to severe frost in winter, the cable may become stuck in the arrested position of the parking brake. The following release and resetting of the actuating lever 1 of the parking brake into a normal position by a spring (not illustrated) would therefore result, in accordance with the action of the adjusting spring 8, in the pull rod 7 being extended by the maximum possible adjustment travel of the cable pull adjustment. A misadjustment caused in this manner of the cable pull adjustment may render complete release of the brake impossible. So that a correct adjustment of the cable pull can be restored even in the event of a process described above, a stop 12 is provided which is fixed on the bodywork and engages on the lever part 5b of the locking element 5 in the normal position of the actuating lever 1, with the result that the latch part 5a of the locking element 5 is disengaged from the notches 7a of the pull rod 7, so that the pull rod 7 is freely moveable in its guide housing 6. A subsequent release of the stuck pull cable 11 then leads again to the device according to the invention being set for operation by means of a brake-resetting means which is provided in a known manner.

What is claimed is:

1. A device for adjusting a cable pull of a vehicle parking brake, comprising:
   an actuating lever rotatable about a first axis;
   a pull element including a pull rod and a guide housing, wherein the pull rod includes notches and is spring-loaded in an actuating direction of the cable pull, the guide housing being pivotably mounted about a second axis, the second axis being disposed outside a line defined by the actuating direction;
   a locking element including a latch part releasably engaging the notches of the pull rod, wherein the locking element is mounted pivotably with respect to the second axis;
   wherein a force acting in the actuating direction of the cable pull creates a torque on the pull element about the second axis, the torque being proportional to the force; and
   wherein the locking element includes a lever part having a portion for engaging the latch part.

2. The device as recited in claim 1, further comprising a pre-loading spring supported on a first side against the guide housing and on a second side against the locking element.

3. The device as recited in claim 1, further comprising a stop arranged at a bodywork part of the vehicle, and wherein in a released position of the actuating lever the locking element engages the stop so as to disengage the locking element from the pull element.

4. The device as recited in claim 1, further comprising a retainer disposed on the pull element for receiving a cable of the cable pull.

5. The device as recited in claim 4, wherein the retainer includes a ball cage pivotably disposed on the pull element.

6. The device as recited in claim 1, further comprising a pin disposed at the guide housing for urging the locking element out of engagement with the pull element when the actuating lever is released.

7. The device as recited in claim 1, further comprising an adjusting spring configured to urge the spring-loading in the actuating direction of the cable pull, said adjusting spring supporting the guide housing against the pull rod in a longitudinal direction of the pull rod.

8. The device as recited in claim 1, wherein the locking element provides notches engaging the pull rod.

9. A device for adjusting a cable pull of a vehicle parking brake, comprising:
   an actuating lever rotatable about a first axis;
   a pull element including a pull rod and a guide housing, wherein the pull rod includes notches and is spring-loaded in an actuating direction of the cable pull, the guide housing being pivotably mounted about a second axis, the second axis being disposed outside a line defined by the actuating direction;
   a locking element including a latch part releasably engaging the notches of the pull rod, wherein the locking element is mounted pivotably with respect to the second axis;
   wherein a force acting in the actuating direction of the cable pull creates a torque on the pull element about the second axis, the torque being proportional to the force; and a lever part arranged on said guide housing and being coupled to said locking element, said lever part being in engagement with said pull rod.

10. The device according to claim 9, wherein said lever part includes a first lever arm and a second lever arm, wherein said first lever arm is coupled to a portion of said locking element, wherein said second lever arm is in contact with said preloading spring, and wherein a pivot axis of said lever arm is arranged between said first lever arm and said second lever arm.

11. The device according to claim 10 wherein said second lever arm comprises a leg said preloading spring is acting on, said leg having a central passage for said release actuator.

12. The device according to claim 9, further comprising a release actuator, the release actuator being provided for abutting against a part of the vehicle when the actuating lever is released such that the lever part pivots the locking element out of engagement with the pull rod.

13. A device for adjusting a cable pull of a vehicle parking brake, comprising:
- an actuating lever rotatable about a first axis;
- a pull element including a pull rod and a guide housing, wherein the pull rod includes notches and is spring-loaded in an actuating direction of the cable pull, the guide housing being pivotably mounted about a second axis, the second axis being disposed outside a line defined by the actuating directing;
- a locking element including a latch part releasably engaging the notches of the pull rod, wherein the locking element is mounted pivotably with respect to the second axis, wherein a force acting in the actuating direction of the cable pull creates a torque on the pull element about the second axis, the torque being proportional to the force; and
- a pre-loading spring supported on a first side against the guide housing and on a second side against the locking element.

14. A device for adjusting a cable pull of a vehicle parking brake, comprising:
- an actuating lever rotatable about a first axis;
- a pull element including a pull rod and a guide housing, wherein the pull rod includes notches and is spring-loaded in an actuating direction of the cable pull, the guide housing being pivotably mounted about a second axis, the second axis being disposed outside a line defined by the actuating direction; and
- a locking element including a latch part releasably engaging the notches of the pull rod, wherein the locking element is mounted pivotably with respect to the second axis, wherein a force acting in the actuating direction of the cable pull creates a torque on the pull element about the second axis, the torque being proportional to the force; and
- a stop arranged at a bodywork part of the vehicle, and wherein in a released position of the actuating lever the locking element engages the stop so as to disengage the locking element from the pull element.

* * * * *